(12) United States Patent
Larose

(10) Patent No.: US 12,196,090 B1
(45) Date of Patent: Jan. 14, 2025

(54) AIRCRAFT PROPULSION SYSTEM AIR MOVER BRAKE

(71) Applicant: Pratt & Whitney Canada Corp., Longueuil (CA)

(72) Inventor: Louis-Philippe Larose, St-Sabine (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/427,190

(22) Filed: Jan. 30, 2024

(51) Int. Cl.
| | |
|---|---|
| *F01D 21/00* | (2006.01) |
| *B64D 27/34* | (2024.01) |
| *B64D 31/18* | (2024.01) |
| *B64D 35/022* | (2024.01) |
| *F01D 13/00* | (2006.01) |
| *F01D 15/10* | (2006.01) |

(52) U.S. Cl.
CPC .......... *F01D 21/006* (2013.01); *B64D 27/34* (2024.01); *B64D 31/18* (2024.01); *B64D 35/022* (2024.01); *F01D 13/00* (2013.01); *F01D 15/10* (2013.01); *F05D 2220/76* (2013.01); *F05D 2260/903* (2013.01)

(58) Field of Classification Search
CPC ........ F01D 21/006; F01D 13/00; F01D 15/10; B64D 27/34; B64D 31/18; B64D 35/022; F05D 2220/76; F05D 2260/903
See application file for complete search history.

(56) References Cited

U.S. PATENT DOCUMENTS

| | | | |
|---|---|---|---|
| 8,757,542 B2 | 6/2014 | Hopdjanian | |
| 11,964,771 B2 * | 4/2024 | Hinman | B64C 27/006 |
| 2017/0260872 A1 * | 9/2017 | Munevar | F01D 21/006 |
| 2019/0084684 A1 * | 3/2019 | Eller | B64C 29/0025 |
| 2019/0218969 A1 | 7/2019 | Fulleringer | |
| 2020/0391877 A1 * | 12/2020 | Erzen | B60L 50/50 |
| 2021/0095636 A1 * | 4/2021 | Seminel | F02C 7/36 |
| 2021/0101691 A1 * | 4/2021 | Mark | B64D 31/06 |

* cited by examiner

*Primary Examiner* — Hoang M Nguyen

(74) *Attorney, Agent, or Firm* — Getz Balich LLC

(57) ABSTRACT

A method of braking a rotational air mover portion of an aircraft propulsion system is provided. The method includes: using an electrical device to apply a torque to a propulsion unit driven by a propulsion system of an aircraft, the propulsion unit including a rotational air mover configured to provide thrust for propelling the aircraft, wherein the electrical device is configured to produce electrical energy during the process of applying the torque to the propulsion unit; controlling the electrical device to apply an amount of the torque that is sufficient to cause the rotational air mover to decelerate or to maintain the rotational air mover non-rotational; and directing the electrical energy produced by the electrical device to an aircraft component.

18 Claims, 3 Drawing Sheets

AIRCRAFT PROPULSION SYSTEM AIR MOVER BRAKE

BACKGROUND OF THE INVENTION

1. Technical Field

The present disclosure relates to hybrid-electric aircraft propulsion systems and methods for operating the same.

2. Background Information

Aircraft propulsion systems use rotating air movers (e.g., propeller, rotor, or the like) to create propulsive power. The propulsive power is used to propel the aircraft on the ground and to provide propulsive power when the aircraft is airborne. When the engine rotationally driving the air mover has shut down, inertia will cause the air movers to continue rotating for some period of time; e.g., a free rotation period. The free rotation period may occur after the aircraft has traveled to its desired location on the ground and the engine has been shut down, or it may occur when the aircraft propulsion system is operated in a non-flight scenario; e.g., maintenance or test procedure, or the like. The rotating air movers present a potential hazard to people (e.g., ground crew, maintenance staff, passengers, and the like) until the air movers are stationary. Some existing aircraft propulsion systems include mechanical braking systems configured to stop air mover rotation. These mechanical braking systems add cost, weight, and likely maintenance requirements.

What is needed is a improved system and/or method for braking aircraft propulsion system air movers

SUMMARY

According to an aspect of the present disclosure, a method of braking a rotational air mover portion of an aircraft propulsion system is provided. The method includes: using an electrical device to apply a torque to a propulsion unit driven by a propulsion system of an aircraft, the propulsion unit including a rotational air mover configured to provide thrust for propelling the aircraft, wherein the electrical device is configured to produce electrical energy during the process of applying the torque to the propulsion unit; controlling the electrical device to apply an amount of the torque that is sufficient to cause the rotational air mover to decelerate or to maintain the rotational air mover non-rotational; and directing the electrical energy produced by the electrical device to an aircraft component.

In any of the aspects or embodiments described above and herein, the propulsion system may be a hybrid electric propulsion (HEP) system that includes a thermal engine, an electric motor, and a gearbox. The thermal engine and the electric motor are in drive communication with the gearbox, and the gearbox is in drive communication with the propulsion unit.

In any of the aspects or embodiments described above and herein, the electric motor of the HEP system may be configured to operate in a first mode to produce drive power to the gearbox, and to operate in a second mode to produce electrical energy, and in the second mode the electric motor of the HEP system is the electrical device that is used to apply the torque to the propulsion unit and to produce electrical energy.

In any of the aspects or embodiments described above and herein, the rotational air mover may be a propeller.

In any of the aspects or embodiments described above and herein, the step of using the electrical device to apply the torque to the propulsion unit may be initiated when the thermal engine of the HEP system is shut off and the propeller is rotating.

In any of the aspects or embodiments described above and herein, the step of controlling the electrical device to apply the amount of the torque may include controlling the amount of torque to produce a predetermined rate of deceleration for the propeller.

In any of the aspects or embodiments described above and herein, the HEP system may include an electric power storage unit, and the step of directing the electrical energy produced by the electrical device to the aircraft component may include directing the electrical energy to the electric power storage unit.

In any of the aspects or embodiments described above and herein, the step of using the electrical device to apply the torque to the propulsion unit may be initiated when the thermal engine of the HEP system is operating and the propeller is rotating.

In any of the aspects or embodiments described above and herein, the step of controlling the electrical device to apply the amount of the torque may include controlling the amount of torque to decelerate the propeller to a non-rotational state and to maintain the propeller in the non-rotational state.

In any of the aspects or embodiments described above and herein, the propulsion system may include an electric generator disposed to be driven by the gearbox, and the electric generator of the HEP system is the electrical device that is used to apply the torque to the propulsion unit and to produce electrical energy.

In any of the aspects or embodiments described above and herein, the propulsion system may be a hybrid electric propulsion (HEP) system that includes a thermal engine, an electric motor, an electric generator, and a gearbox, wherein the thermal engine and the electric motor are in drive communication with the gearbox, and the electric generator is disposed to be driven by the gearbox, and the gearbox is in drive communication with the propulsion unit.

In any of the aspects or embodiments described above and herein, the electric motor of the HEP system may be configured to operate in a first mode to produce drive power to the gearbox, and to operate in a second mode to produce electrical energy, and the electrical device that is used to apply the torque to the propulsion unit and to produce electrical energy may include at least one of the electric motor of the HEP system operating in the second mode, or the electric generator.

In any of the aspects or embodiments described above and herein, the propulsion system may include an electric motor and a gearbox, and the electric motor is in drive communication with the gearbox, and the gearbox is in drive communication with the propulsion unit, and the electric motor may be configured to operate in a first mode to produce drive power to the gearbox, and to operate in a second mode to produce electrical energy, and in the second mode the electric motor is the electrical device that is used to apply the torque to the propulsion unit and to produce electrical energy.

In any of the aspects or embodiments described above and herein, the rotational air mover may be a propeller.

In any of the aspects or embodiments described above and herein, the step of using the electrical device to apply the torque to the propulsion unit may be initiated when the propeller is rotating.

In any of the aspects or embodiments described above and herein, the step of controlling the electrical device to apply the amount of the torque may include controlling the amount of torque to decelerate the propeller to a non-rotational state and to maintain the propeller in the non-rotational state.

According to an aspect of the present disclosure, an aircraft propulsion system is provided that includes a propulsion unit, an electrical device, and a system controller. The propulsion unit includes a rotational air mover configured to provide thrust for propelling an aircraft. The electrical device is configured to apply a torque to the propulsion unit, and is configured to produce electrical energy during the process of applying the torque to the propulsion unit. The system controller is in communication with the electrical device and a non-transitory memory storing instructions. The instructions when executed cause the system controller to: control the electrical device to apply an amount of the torque that is sufficient to cause the rotational air mover to decelerate or to maintain the rotational air mover non-rotational, and direct the electrical energy produced by the electrical device to an aircraft component.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
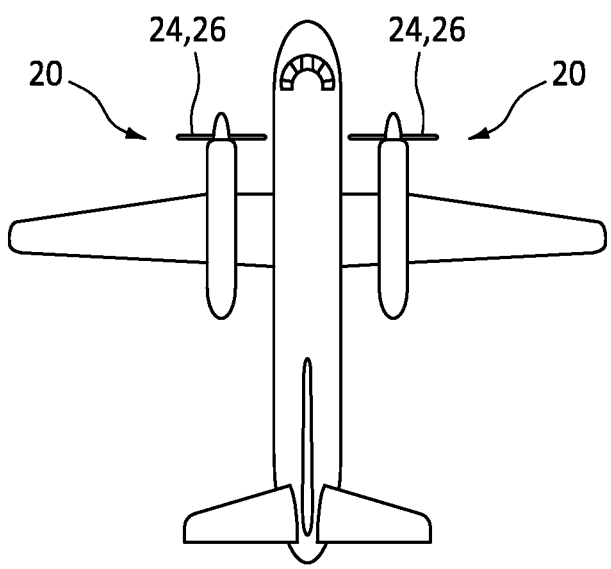
FIG. 1 is a diagrammatic view of a fixed wing aircraft having a pair of aircraft propulsion systems according to an embodiment of the present disclosure.
Figure 2:
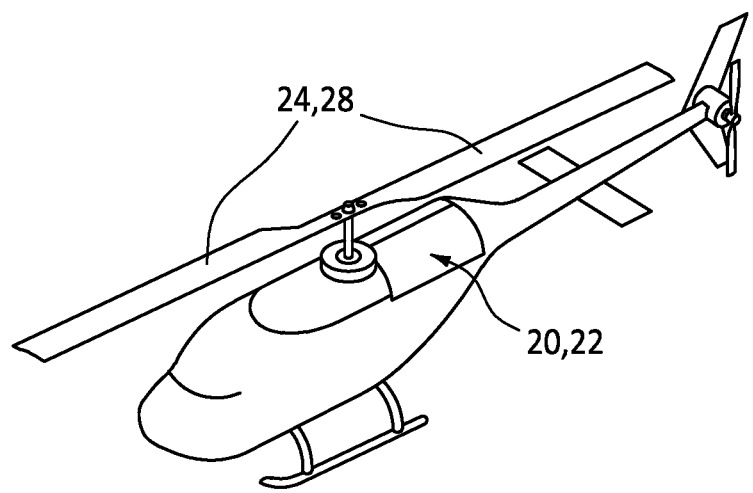
FIG. 2 is a diagrammatic view of a rotary aircraft having an aircraft propulsion system according to an embodiment of the present disclosure.

Referring to FIGS. 1 and 2, the present disclosure is directed to an aircraft propulsion system 20 that utilizes an engine to drive a propulsion unit 22 that includes an air mover 24. The "engine" that drives the propulsion unit 22 may be a thermal engine, or the engine may be an electric motor, or it may be a hybrid-electric propulsion (HEP) system that includes a thermal engine and an electric motor. The present disclosure may be used with a number of different aircraft types, such as the fixed wing aircraft shown in FIG. 1 that includes a pair of aircraft propulsion systems 20 that drive propellers 26, or a rotary aircraft (e.g., a helicopter as shown in FIG. 2) that includes a propulsion system 20 that drives rotor blades 28, or the like. The present disclosure is not limited to these aircraft examples, and is applicable to other aircraft including those that are configured for manned operation and those configured for unmanned operation.

Figure 3:
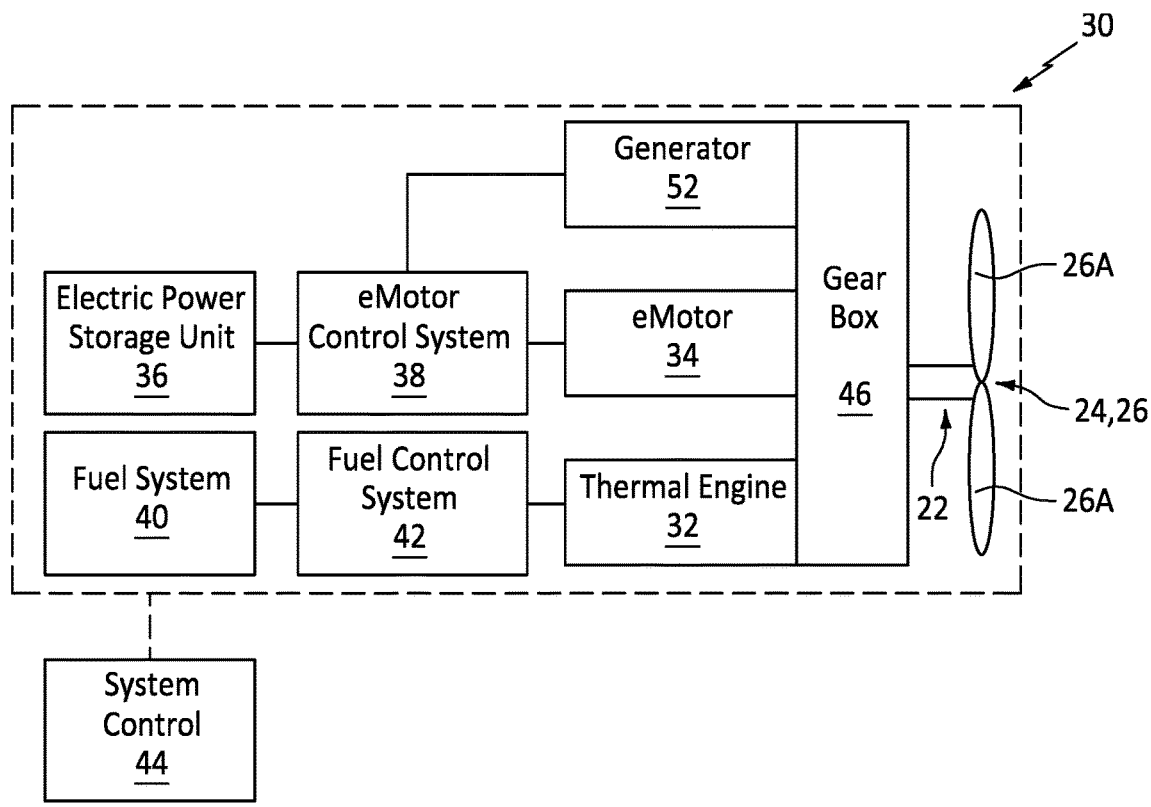
FIG. 3 is a diagrammatic representation of a present disclosure HEP system in a parallel configuration.
Figure 4:
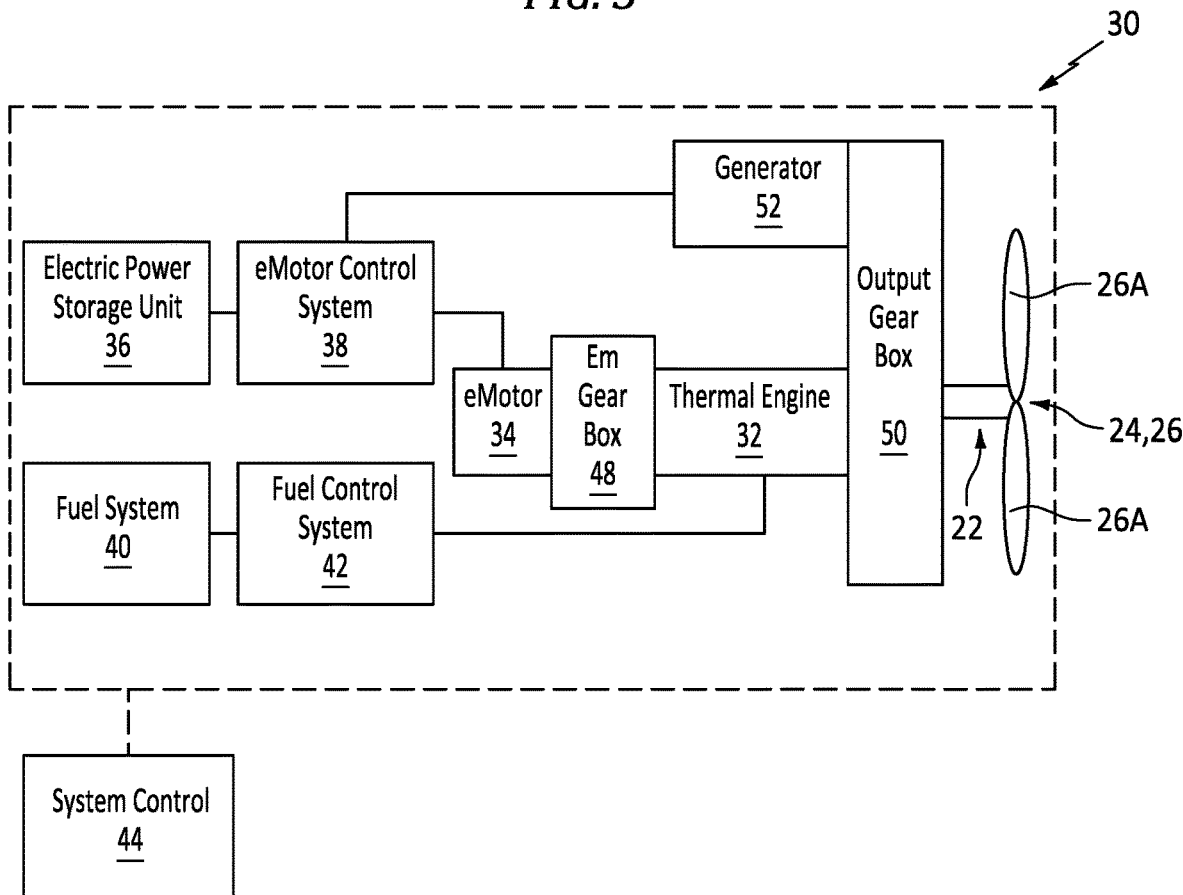
FIG. 4 is a diagrammatic representation of a present disclosure HEP system in a series configuration.

FIGS. 3 and 4 illustrate examples of hybrid-electric propulsion (HEP) system 30 that may be used to drive a propulsion unit 22. In these examples, the HEP system 30 includes a thermal engine 32, an electric motor ("eMotor 34"), an electric power storage unit 36, an eMotor control system 38, a fuel system 40, a fuel control system 42, and a system controller 44. In HEP system 30 embodiment shown in FIG. 3, a gearbox 46 is included. In HEP system 30 embodiment shown in FIG. 4, an eM gearbox 48 and an output gearbox 50 is included. The HEP system 30 embodiment shown in FIG. 3 is shown with an electric generator 52 in drive communication with the gearbox. The HEP system 30 embodiment shown in FIG. 4 is shown with an electric generator 52 in drive communication with the output gearbox 50.

Figure 5:
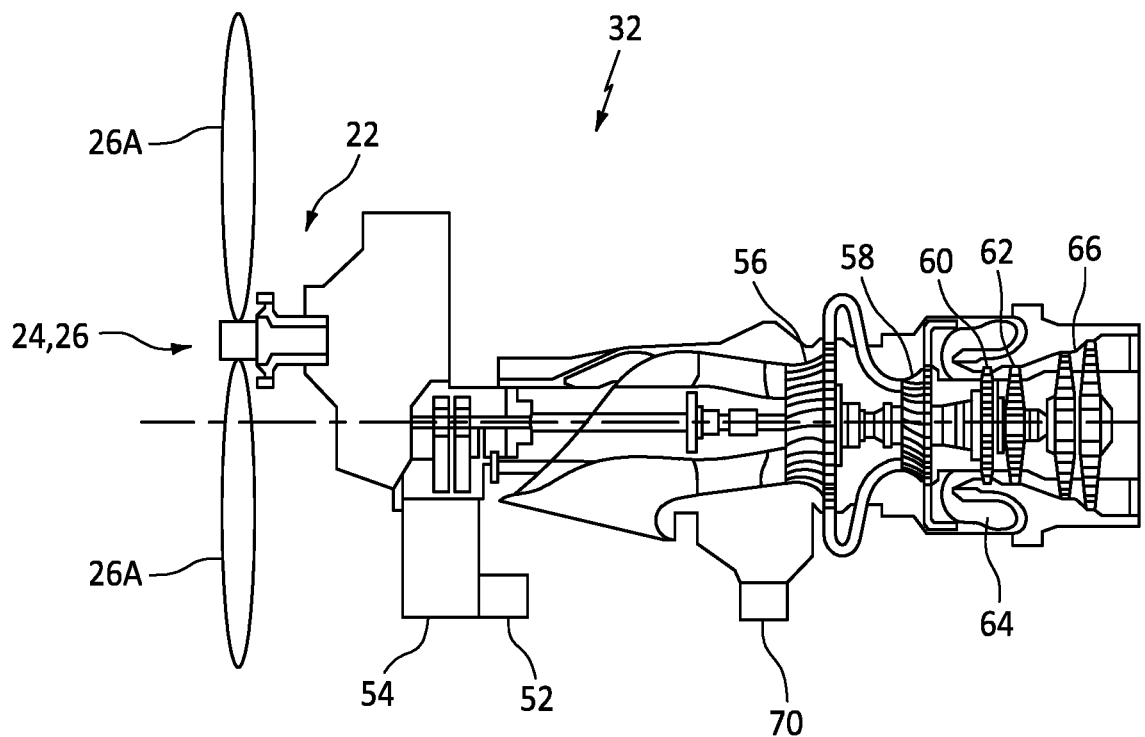
FIG. 5 is a diagrammatic sectional view of an exemplary gas turbine engine.

The present disclosure is not limited to any particular type of thermal engine 32. In the HEP systems 30 diagrammatically shown in FIGS. 3 and 4, the thermal engine 32 may be a gas turbine engine, or a piston engine or a rotary engine, or the like. FIG. 5 diagrammatically illustrates an example of a gas turbine engine that may be used with the present disclosure (e.g., within a HEP system 30). The gas turbine engine shown in FIG. 5 includes a reduction gearbox 54, a low pressure compressor 56, a high pressure compressor 58, a high pressure turbine 60, a low pressure turbine 62, and a combustor 64. In some instances, the thermal engine 32 may include one or more power turbines 66. In some embodiments, the engine may include an electrical generator 52 in communication with and driven by the gearbox 54. A propulsion unit 22 including an air mover 24 (e.g., a propeller 26) is shown in combination with the gas turbine engine. The present disclosure is not limited to the gas turbine engine example shown in FIG. 5.

In a HEP system 30 such as those shown in FIGS. 3 and 4, the eMotor 34 may be an alternating current (AC) motor configured to rotationally drive a component. For example, the eMotor 34 may be configured to rotationally drive at least a portion of a gearbox, or may be configured to provide rotational drive to a thermal engine 32, or the like. When operating as an electric motor, the eMotor 34 produces a mechanical power output that is a function of the torque produced by the eMotor 34 and the angular speed of the motor. To facilitate the description herein, the eMotor 34 output is described herein as torque. As will be described herein, the eMotor 34 within the HEP system 30 may be controlled to operate alternatively as an electric generator. The eMotor 34 functioning as an electric generator is referred to hereinafter as an "eM generator". When functioning as a generator, the eM generator must be driven; i.e., the eM generator requires a work input (i.e., an input torque) which it converts to electrical energy. A load may be applied to the eM generator to affect the amount of torque required to drive the eM generator. A change in the magnitude of the load applied to the eM generator will change to the amount of torque required to drive the eM generator.

Figure 6:
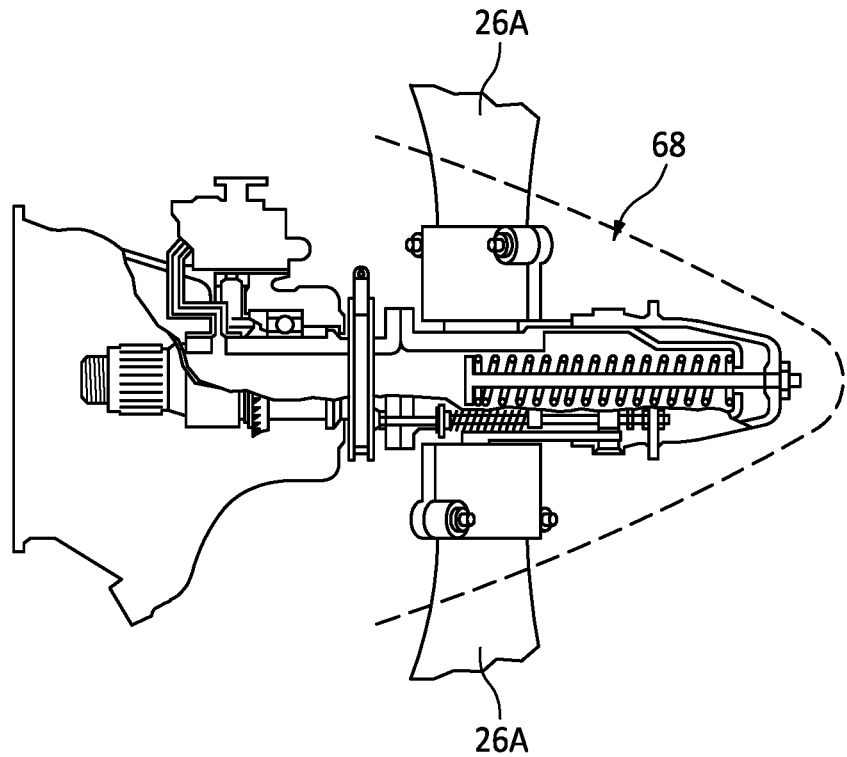
FIG. 6 is a diagrammatic representation of a propulsion unit with a hydro-mechanical pitch change mechanism.

The propulsion unit 22 is a driven device that is configured to selectively produce thrust that can be used to power an aircraft. In a fixed wing aircraft, the propulsion unit 22 may include a propeller 26 that has propeller blades 26A and a mechanism for adjusting the pitch of the propeller blades 26A (sometimes referred to as a "pitch change mechanism"). Pitch change mechanisms are known in the art, and the present disclosure is not limited to any particular type of pitch change mechanism for adjusting propeller pitch. A non-limiting example of a pitch change mechanism 68 is shown in FIG. 6. In a rotary aircraft, the propulsion unit 22 may include rotary blades 28; e.g., a helicopter application-see FIG. 2.

The electric power storage unit 36 is configured to selectively store electrical energy in a first operational mode (i.e., a charging mode), and to produce electrical energy in a second operational mode (i.e., a discharging mode). An example of an electric power storage unit 36 is one that includes one or more batteries. Electric power storage devices other than batteries may be used in some embodiments.

The eMotor control system 38 may include hardware and controls for providing electrical power to the eMotor 34. In those embodiments wherein the electric power storage unit 36 provides the electrical power used to power the eMotor 34, the eMotor control system 38 may include an inverter configured to manage electrical power from the electric power storage unit 36. In those instances when the eMotor 34 is controlled to operate as an electric motor, the eMotor control system 38 controls the eMotor 34 to produce the desired amount of torque for driving the propulsion unit 22 solely or in combination with the thermal engine 32. In those instances when the eMotor 34 is controlled to operate as an eM generator, the eMotor control system 38 controls the eM generator to produce a desired amount of electrical energy and/or controls the eM generator to require a defined amount of drag torque when being driven. The eMotor control system 38 may also control the eM generator to vary the amount of drag torque required to drive the eM generator.

The fuel system may include a fuel reservoir and one or more fuel pumps for pumping the fuel to the thermal engine 32.

The fuel control system 42 may include an electronic controller such as a FADEC or may include a mechanical controller, or any combination thereof. The present disclosure is not limited to any particular type of fuel control system.

The gearbox 46, 48, 50, 54 may assume different configurations. The term "gearbox" as used herein may refer to a reduction gearbox that is configured to accept an input rotational drive at a first rotational drive speed (S1) and at a first torque (T1) and produce an output rotational drive at a second rotational drive speed (S2) and at a second torque (T2), wherein the first rotational drive speed is greater than the second rotational drive speed (S1>S2) and the second torque is greater than the first torque (T2>T1). The present disclosure is not limited to any particular type of gearbox.

The term "controller" (including the system controller 44 shown in FIGS. 3 and 4) as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the respective component to accomplish the same algorithmically and/or coordination of system components. A controller may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. A controller may include, or may be in communication with, an input device that enables a user to enter data and/or instructions, and may include, or be in communication with, an output device configured, for example to display information (e.g., a visual display or a printer), or to transfer data, etc. Communications between a controller and other system components may be via a hardwire connection or via a wireless connection.

In HEP system 30 embodiment shown in FIG. 3, the gearbox 46 may be driven by the thermal engine 32, or by the eMotor 34, or a combination thereof, and the gearbox 46 is in drive communication with the propulsion unit 22; e.g., a parallel configuration. The HEP system 30 embodiment shown in FIG. 4 may be described as a series configuration, wherein the propulsion unit 22 is in drive communication with the output gearbox. The output gearbox 50 may be driven by the thermal engine 32. The thermal engine 32 may be driven partially or completely by the eMotor 34 through the eM gearbox 48. An example of the eMotor 34 "partially driving" the thermal engine 32 is when the eMotor 34 is providing rotational motive force to the thermal engine 32 when the thermal engine 32 itself is operating. An example of the eMotor 34 "completely driving" the thermal engine 32 is when the eMotor 34 is providing rotational motive force to the thermal engine 32 when the thermal engine 32 is not operating. The HEP system 30 embodiments shown in FIGS. 3 and 4 are examples of HEP systems 30 that may be used with the present disclosure and the present disclosure is not limited thereto.

A HEP system 30, as may be utilized with the present disclosure, may use any combination of the eMotor 34 and the thermal engine 32 to provide motive force to an air mover 24, and the relative contributions of motive force provided by the eMotor 34 and the thermal engine 32 may change during different portions of the flight mission; e.g., the thermal engine 32 may alone provide the motive force necessary for takeoff, both the thermal engine 32 and the eMotor 34 may provide motive force during a cruise portion of the flight mission, and so on.

As will be detailed herein, embodiments of the present disclosure provide air mover 24 braking by utilizing a drag torque produced by an electric generator 52 or by a device operating as an electric generator; e.g., an eM generator. In an electrically powered aircraft, the eMotor 34 that is used to provide drive power to the propulsion system may be operated as an eM generator. An electrically powered aircraft may also include an electric generator 52 dedicated to providing electrical power to the aircraft. In a HEP powered aircraft, an eMotor 34 that is used to provide drive power to the propulsion system may be operated as an eM generator. A HEP powered aircraft may also include an electric generator 52 dedicated to providing electrical power to the aircraft; e.g., a generator 52 in drive communication with a gearbox as shown in FIGS. 3 and 4. The thermal engine 32 within a HEP powered aircraft may include an electric starter 70 (e.g., see FIG. 5) for the thermal engine 32 that may be operated as an electric generator. In an aircraft powered solely by a thermal engine 32, that thermal engine 32 may include an electric starter 70 that may be operated as an electric generator. The present disclosure is not limited to any of these examples of an aircraft propulsion system 20 having an electric generator or a device that can be operated as an electric generator.

To facilitate the description herein, an example of the present disclosure will be described hereinafter in terms of a HEP system 30 that includes a propulsion unit 22 having an air mover 24 in the form of a propeller 26, and in terms of a HEP system 30 wherein the eMotor 34 is controlled to operate as an eM generator. As indicated above, the present disclosure is not limited to this particular example.

Aspects of the present disclosure are directed to braking a propeller 26, for example when the aircraft is stationary on the ground, and the propeller 26 is rotating. A first such scenario is when the drive engine of the aircraft propulsion system 20 is shut down; e.g., the aircraft has arrived at its destination or the maintenance/testing procedure is complete. In this scenario, the rotational inertia of the propeller 26 will continue to rotate the propeller 26 for some time despite the fact that the drive engine of the aircraft propulsion system 20 is shut down. A second such scenario is when the aircraft is stationary on the ground and the aircraft propulsion system 20 is maintained operating; e.g., the aircraft propulsion system 20 remains running because the aircraft will be needed quickly to once again takeoff, or environmental conditions are such that it is advantageous to not turn the aircraft propulsion system 20 off, or the like.

Aspects of the present disclosure may also be directed to braking a propeller 26 during an aircraft landing or taxiing procedure.

A generator requires a "work" input to enable the generator to produce electrical energy, that work input is described herein as a "drag torque" that the eM generator applies to the propeller 26. The drag torque applied to the propeller 26 opposes the rotating propeller 26. In a scenario wherein the aircraft propulsion system 20 is shut down and rotational inertia of the propeller 26 causes the propeller 26 to continue rotating, the drag torque applied to the rotating propeller 26 opposes the rotational inertia and thereby decelerates ("brakes") the propeller 26. Once the drag torque applied to the propeller 26 exceeds the energy associated with the rotating propeller 26, the propeller 26 stops rotating. In a scenario wherein the aircraft propulsion system 20 remains operating, a drag torque may be applied to the propulsion unit 22 that is initially greater than the energy input into the propulsion unit 22 that would otherwise cause the propeller 26 to rotate, thereby braking the propeller 26. Once the propeller 26 rotation is stopped, the drag torque may be controlled to be substantially equal to the energy input into the propulsion unit 22, thereby maintain the propeller 26 non-rotational.

Operating the eM generator to produce electricity causes the eM generator to apply the drag torque to the propulsion unit 22 that is used to brake the propeller 26. The electrical energy produced by the eM generator may be utilized in a variety of ways. For example, the electrical energy produced by the eM generator may be used to charge the electric power storage unit 36, or may be used by electrical components (e.g., an air conditioning module) within the aircraft, or may directed to components configured to dissipate the electrical energy; e.g., a component that converts the electrical energy to a thermal load which may be used for heating purposes or environmentally dissipated.

Embodiments of the present disclosure may be configured to permit propeller 26 braking in a controlled manner by controlling the operation of the eM generator. An increase in the electrical energy output of the eM generator will increase the drag torque applied to the propulsion unit 22 by the eM generator. Conversely, a decrease in the electrical energy output of the eM generator will decrease the drag torque applied to the propulsion unit 22 by the eM generator. Hence, controlled braking of the propeller 26 may be accomplished by controlling the operation of the eM generator. The controlled braking may be utilized to control the propeller 26 rate of deceleration or to control the amount of braking force required to maintain a propeller 26 non-rotational.

As stated above, the present disclosure is not limited to the above-described example of propeller 26 braking using the eMotor 34 of a HEP system 30 controlled to operate as an eM generator. For example, in an electrically powered aircraft, the eMotor 34 that provides drive power to the propulsion unit 22 may be operated as an eM generator to produce the drag torque utilized for braking purposes. As another example, a HEP system 30 powered aircraft may include an electric generator 52 dedicated to providing electrical power to the aircraft (e.g., driven by a gearbox 46, 50 as shown in FIGS. 3 and 4). In this example, the electric generator 52 may be controlled to operate as an electric generator to produce the drag torque utilized for braking purposes. In similar fashion, an aircraft powered by a thermal engine 32 may include an electric generator 52 dedicated to providing electrical power to the aircraft (e.g., see FIG. 5), and that electric generator 52 may be controlled to produce the drag torque utilized for braking purposes. In another example, an aircraft powered by a thermal engine 32 may include an electric starter 70 (for the thermal engine 32) that may be operated as an electric generator and that starter/generator may be controlled to produce the drag torque utilized for braking purposes. The present disclosure is not limited to any of these examples of an electric generator or a device that can be operated as an electric generator being used to produce a drag torque for braking purposes.

The drag torque applied by the eM generator (or device that can be operated as an electric generator) may be the sole opposing force decelerating the propeller 26, or the drag torque may be applied in combination with other mechanisms that cause propeller 26 deceleration. For example, as described herein it is known for an aircraft to have a propeller mechanical braking system (not shown). In some embodiments, the present disclosure may be used in combination with a propeller mechanical braking system. In such an embodiment, the present disclosure can be operated to reduce the amount of braking that the propeller mechanical braking system is required to produce, and thereby decrease the propeller mechanical braking system sizing requirements (and potentially the weight and cost thereof) and/or decrease wear of the propeller mechanical braking system. Another example of a mechanism that may be used to cause propeller 26 deceleration is a propeller pitch change mechanism 68. In some embodiments, the present disclosure may be used in combination with a pitch change mechanism 68 to decelerate the propeller 26.

Embodiments of the present disclosure may be described herein as a process which is depicted as a flowchart, a flow diagram, a block diagram, etc. Although any one of these structures may describe the operations as a sequential process, many of the operations can be performed in parallel and/or concurrently. In addition, the order of the operations may be rearranged. A process may correspond to a method, a function, a procedure, a subroutine, a subprogram, etc.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of braking a rotational air mover portion of an aircraft propulsion system, the method comprising:
    using an electrical device to apply a torque to a propulsion unit, the propulsion unit driven by a hybrid electric propulsion (HEP) system of an aircraft, the HEP system including a thermal engine, the propulsion unit including the rotational air mover configured to provide thrust for propelling the aircraft, wherein the electrical device is configured to produce electrical energy during the process of applying the torque to the propulsion unit, wherein applying the torque to the propulsion unit is initiated when the thermal engine of the HEP system is shut off and the rotational air mover is rotating;
    controlling the electrical device to apply an amount of the torque that is sufficient to cause the rotational air mover to decelerate or to maintain the rotational air mover non-rotational; and
    directing the electrical energy produced by the electrical device to an aircraft component.

2. The method of claim 1, wherein the HEP system includes an electric motor and a gearbox, wherein the thermal engine and the electric motor are in drive communication with the gearbox, and the gearbox is in drive communication with the propulsion unit.

3. The method of claim 2, wherein the electric motor of the HEP system is configured to operate in a first mode to produce drive power to the gearbox, and to operate in a second mode to produce electrical energy, and in the second mode the electric motor of the HEP system is the electrical device that is used to apply the torque to the propulsion unit and to produce electrical energy.

4. The method of claim 3, wherein the rotational air mover is a propeller.

5. The method of claim 1, wherein the step of controlling the electrical device to apply the amount of the torque includes controlling the amount of torque to produce a predetermined rate of deceleration for the rotational air mover.

6. The method of claim 1, wherein the HEP system includes an electric power storage unit, and the step of directing the electrical energy produced by the electrical device to the aircraft component includes directing the electrical energy to the electric power storage unit.

7. The method of claim 4, wherein the step of controlling the electrical device to apply the amount of the torque includes controlling the amount of torque to decelerate the propeller to a non-rotational state and to maintain the propeller in the non-rotational state.

8. The method of claim 2, wherein the HEP system further includes an electric generator disposed to be driven by the gearbox, and the electric generator of the HEP system is the electrical device that is used to apply the torque to the propulsion unit and to produce electrical energy.

9. The method of claim 1, wherein the HEP system includes an electric motor, an electric generator, and a gearbox, wherein the thermal engine and the electric motor are in drive communication with the gearbox, and the electric generator is disposed to be driven by the gearbox, and the gearbox is in drive communication with the propulsion unit.

10. The method of claim 9, wherein the electric motor of the HEP system is configured to operate in a first mode to produce drive power to the gearbox, and to operate in a second mode to produce electrical energy; and the electrical device that is used to apply the torque to the propulsion unit and to produce electrical energy includes at least one of the electric motor of the HEP system operating in the second mode, or the electric generator.

11. The method of claim 1, wherein the HEP system includes an electric motor and a gearbox, and the electric motor is in drive communication with the gearbox, and the gearbox is in drive communication with the propulsion unit; and wherein the electric motor is configured to operate in a first mode to produce drive power to the gearbox, and to operate in a second mode to produce electrical energy, and in the second mode the electric motor is the electrical device that is used to apply the torque to the propulsion unit and to produce electrical energy.

12. The method of claim 11, wherein the rotational air mover is a propeller.

13. The method of claim 12, wherein the step of controlling the electrical device to apply the amount of the torque includes controlling the amount of torque to decelerate the propeller to a non-rotational state and to maintain the propeller in the non-rotational state.

14. The method of claim 1, wherein the HEP system includes an electric generator and a gearbox, and the thermal engine is in drive communication with the gearbox, and the electric generator is disposed to be driven by the gearbox, and the gearbox is in drive communication with the propulsion unit; and the electric generator is the electrical device that is used to apply the torque to the propulsion unit and to produce electrical energy.

15. An aircraft propulsion system, comprising:

a propulsion unit that includes a rotational air mover configured to provide thrust for propelling an aircraft;

a hybrid electric propulsion (HEP) system that includes a thermal engine, the propulsion unit driven by the HEP system;

an electrical device configured to apply a torque to the propulsion unit, and configured to produce electrical energy during the process of applying the torque to the propulsion unit, wherein the process of applying the torque to the propulsion unit is initiated when the thermal engine of the HEP system is shut off and the rotational air mover is rotating; and a system controller in communication with the electrical device and a non-transitory memory storing instructions, which instructions when executed cause the system controller to:

control the electrical device to apply an amount of the torque that is sufficient to cause the rotational air mover to decelerate or to maintain the rotational air mover non-rotational; and direct the electrical energy produced by the electrical device to an aircraft component.

16. The system of claim 15, wherein the HEP system includes an electric motor, and a gearbox, wherein the thermal engine and the electric motor are in drive communication with the gearbox, and the gearbox is in drive communication with the propulsion unit; and wherein the electric motor of the HEP system is configured to operate in a first mode to produce drive power to the gearbox, and to operate in a second mode to produce electrical energy, and in the second mode the electric motor of the HEP system is the electrical device.

17. The method of claim 3, wherein the electric motor and the thermal engine provide a motive force to the rotational air mover in the first mode.

18. The system of claim 16, wherein the electric motor and the thermal engine provide a motive force to the rotational air mover in the first mode.

* * * * *